US008670075B2

(12) United States Patent
Wang et al.

(10) Patent No.: US 8,670,075 B2
(45) Date of Patent: Mar. 11, 2014

(54) IMAGE INTERPOLATION FOR MOTION/DISPARITY COMPENSATION

(75) Inventors: Demin Wang, Ottawa (CA); Andre Vincent, Gatineau (CA); Philip Blanchfield, Kanata (CA); Robert Klepko, Kanata (CA)

(73) Assignee: Her Majesty the Queen in Right of Canada as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 672 days.

(21) Appl. No.: 12/923,476

(22) Filed: Sep. 23, 2010

(65) Prior Publication Data

US 2011/0069237 A1    Mar. 24, 2011

Related U.S. Application Data (60) Provisional application No. 61/244,901, filed on Sep. 23, 2009.

(51) Int. Cl.
*H04N 5/14* (2006.01)
*G06K 9/32* (2006.01)

(52) U.S. Cl.
USPC .................... 348/699; 382/300; 375/240.16

(58) Field of Classification Search
None
See application file for complete search history.

(56) References Cited

U.S. PATENT DOCUMENTS 6,625,333 B1 * 9/2003 Wang et al. .................... 382/300
2005/0078755 A1 * 4/2005 Woods et al. ............. 375/240.24
2007/0230830 A1 * 10/2007 Ohwaki et al. ................ 382/300

OTHER PUBLICATIONS

Orchard et al., "Overlapped Block Motion Compensation: An Estimation—Theoretic Approach" Image Processing, IEEE Transactions, vol. 3, Issue: 5 ), Sep. 1994, pp. 693-699.*
1—"Motion-Compensated Frame Rate Up-Conversion—Part I: Fast Multi-Frame Motion Estimation" Wang et al. IEEE Transactions on Broadcasting, vol. 56, No. 2, Jun. 2010, 133-141.
2—"Motion-compensated interpolation for scan rate up-conversion," Huang et al., Optical Engineering, vol. 35, No. 1, pp. 166-176, Jan. 1996.
3—"Frame-rate up-conversion Using transmitted Motion and Segmentation Fields for Very Low Bit-rate Video Coding" Han et al., IEEE, 1997, 747-750.
4—"Motion-Compensated Interpolation for Low-Bit-Rate Video Quality Enhancement" Kuo et al, SPIE, vol. 3460, San Diego CA, Jul. 1998 277-288.
5—"Hybrid global-local motion compensated frame interpolation for low bit rate video coding" Liu et al. Journal of Visual Communication & Image Representation, vol. 14, 2003, 61-79.

(Continued)

Primary Examiner — Joseph Ustaris
Assistant Examiner — Jill Sechser
(74) Attorney, Agent, or Firm — Teitelbaum & MacLean; Neil Teitelbaum; Doug MacLean (57) ABSTRACT

Methods of image interpolation disclosed herein include a method of irregular-grid expanded-block weighted motion compensation (IEWMC) and a method of block-wise directional hole interpolation (BDHI). The IEWMC can be used with unidirectional motion or disparity trajectories. The IEWMC can be applied in both forward and backward directions, and the interpolated images resulting from IEWMC application can be superimposed, or averaged, to reduce the blocking artifacts and handle the holes and overlaps. The BDHI takes into account the orientation of local edges and textures when filling the holes, which results in a sharper interpolated image.

14 Claims, 7 Drawing Sheets
(1 of 7 Drawing Sheet(s) Filed in Color)

(56) References Cited

OTHER PUBLICATIONS

6—"Frame Interpolation Scheme using inertia motion prediction" Liu et al., Signal Processing Image Communication, 18, 2003 221-229.

7—"A new method for region-based depth ordering in a video sequence: application to frame interpolation," Benois-Pineau et al. Journal of Visual Communication and Image Representation, vol. 13, pp. 363-385, 2002.

8—"Advanced Frame Rate Conversion and Performance Evaluation" Blanchfield et al. SMPTE Motion Imaging Journal, Apr. 2006, 153-159.

9—"Efficient Prediction of uncovered background in interframe coding using spatial extrapolation", Kaup et al. IEEE 1994 V-501-504.

10—"Image inpainting," Bertalmio et al. Computer Graphics (SIGRAPG 2000), Jul. 2000, pp. 417-424.

11—"Structure and Texture Filling-In of Missing Image Blocks in Wireless Transmission and Compression Applications" Rane et al., IEEE Transactions on Image Processing, vol. 12, No. 3, Mar. 2003 296-303.

12—"Region Filling and Object Removal by Exemplar-Based Image Inpainting" Criminisi et al. IEEE Transactions on Image Processing, vol. 13, No. 9, Sep. 2004.

13—"New frame rate up-conversion using bi-directional motion estimation," Choi et al. IEEE Trans. Consumer Electronics, vol. 46, No. 3, pp. 603-609, Aug. 2000.

14—"Motion Compensated Frame Interpolation by new Black-based Motion Estimation Algorithm" Ha et al; IEEE Transactions on Consumer Electronics, vol. 50, No. 2, May 2004, 752-759.

15—"An Efficient Frame Rate Up-Conversion Method for Mobile Phone with Projections Functionality" Lee et al. IEEE Transactions on Consumer Electronics, vol. 53, No. 4, Nov. 2007, 1615-1621.

16—"Motion compensated frame rate up-conversion using extended bilateral motion estimation", Kang et al. IEEE Trans. Consumer Electronics, vol. 53, No. 4, pp. 1759-1767, Nov. 2007.

17—"Multiframe-based Bilateral Motion Estimation with Emphasis on Stationary Caption Processing for Frame Rate Up-Conversion" Kang et al. IEEE Transactions on Consumer Electronics, vol. 54, No. 4, Nov. 2008, 1830-1838.

18—"A method for motion adaptive frame rate up-conversion," Castagno et al. IEEE Trans. Circuits and Systems for Video Technology, vol. 6, No. 5, pp. 436-445, Oct. 1996.

19—"Using Motion-Compensated Frame-Rate Conversion for the Correction of 3 : 2 Pulldown Artifacts in Video Sequences" Hilman et al. IEEE Transactions on Circuits and Systems for Video Technology, vol. 10, No. 6, Sep. 2000, 869-877.

20—"Weighted-Adaptive Motion-Compensated Frame Rate Up-Conversion" Lee et al., IEEE Transaction on Consumer Electronics, vol. 49, No. 3, Aug. 2003, 485-492.

2—"Frame Rate Up-conversion Using Perspective Transform" Choi et al. IEEE Transactions on Consumer electronics, vol. 52, No. 3, Aug. 2006, 975-982.

22—"Quality Enhancement of Frame Rate Up-Converted Video by Adaptive Frame Skip and Reliable Motion Extraction" Yang et al. IEEE Transactions on Circuits and systems for Video Technology, vol. 17, No. 12, Dec. 2007, 1700-1713.

23—"A Novel Spatial and Temporal Correlation Integrated Based Motion-Compensated Interpolation for Frame Rate Up-Conversion" Ling et al. IEEE Transactions on Consumer Electronics, vol. 54, No. 2, May 2008 863-869.

24—"A Multistage Motion Vector Processing Method for Motion-Compensated Frame Interpolation" Huang et al. IEEE Transactions on Image Processing, vol. 17, No. 5, May 2008, 694-708.

25—"Correlation-Based Motion Vector Processing With Adaptive Interpolation Scheme for Motion-Compensated Frame Interpolation" Huang et al. IEEE Transactions on Image Processing, vol. 18, No. 4, Apr. 2009, 740-752.

26—"Line Transmission of Non-Telephone Signals—Video Coding for low Bitrate communication" Sullivan, Telecommunication Standardization Section of ITU Draft H.263 Mar. 6, 1997.

27—"Overlapped Block Motion Compensation: An Estimation—Theoretic Approach" Orchard et al., IEEE Transactions on Image Processing, vol. 3, No. 5, Sep. 1994, 693-699.

* cited by examiner

*Prior Art*

IMAGE INTERPOLATION FOR MOTION/DISPARITY COMPENSATION

CROSS-REFERENCE TO RELATED APPLICATIONS

The present invention claims priority from U.S. Appln No. 61/244,901 filed Sep. 23, 2009 which is incorporated herein by reference for all purposes.

TECHNICAL FIELD

The present invention relates to methods of image interpolation, and in particular to temporal interpolation for adjusting video frame rate, and/or to spatial interpolation for adjusting stereoscopic 3D effect.

BACKGROUND OF THE INVENTION

When a motion picture needs to be transmitted or displayed at a frame rate different from an original frame rate of the motion picture, or when a perceived depth of a stereoscopic image pair needs to be adjusted, a need arises to "interpolate" between two images. The term "image interpolation" refers to obtaining an image displaying objects, the shape, size, brightness, color, and/or position of which is intermediate between those of corresponding objects of the two known images.

Temporal image interpolation is used in frame rate up-conversion to increase the number of displayed images per second in a video or film sequence. It creates a more smooth motion in the video or converts between different video and film frame rates that are used around the world. Frame rate up-conversion is also used in a low bit rate video transmission. In this case, the source video is temporally down-sampled to a low frame rate and transmitted at a low bit rate. At the receiver, the original frame rate is recovered using frame rate up-conversion.

View interpolation based on so called disparity compensation reconstructs intermediate views or images between the left-eye and right-eye views of a stereoscopic still image pair or video. It is used to create multi-view video, adjust perceptional depth, and guide graphic and text editing and integration in 3D video.

Motion-compensated or disparity-compensated interpolation creates new images by image interpolation along so called motion trajectories or disparity trajectories, respectively. The motion or disparity trajectories correspond to movement or displacement of individual objects or individual blocks of pixels in going from one image to another. The quality of thus created images depends on an accuracy of estimation of the motion or disparity trajectories, as well as on performance of image processing methods used to smooth or even out the transitions between objects or blocks of pixels that have been displaced along the motion or disparity trajectories. An array of vectors corresponding to motion or disparity trajectories of individual blocks of pixels in going from one image to another is commonly called a "motion field" or a "disparity map".

Figure 1:
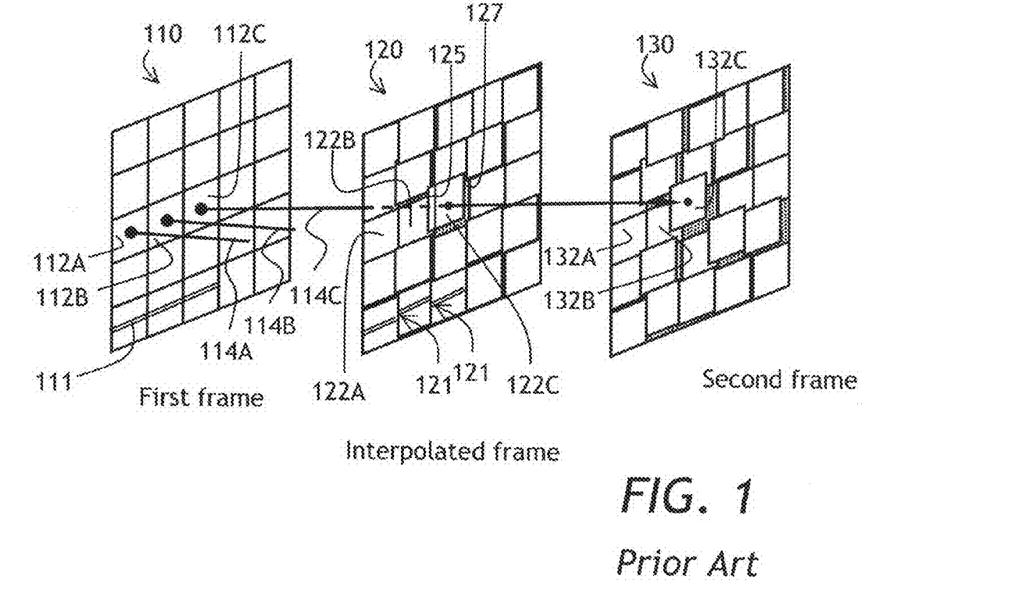
FIG. 1 is an exploded view of two images and an interpolated image therebetween formed using a prior-art unidirectional motion field.

Referring to FIG. 1, a prior-art method of motion-compensated video frame interpolation between a first video frame 110 and a second video frame 130 is illustrated. The method includes steps of dividing the first video frame 110 into rectangular blocks 112A, B, C . . . ; obtaining the motion field by estimating motion vectors 114A, B, C . . . for each block 112A, B, C . . . in going from the first video frame 110 to the second video frame 130; and creating an interpolated video frame 120 along the estimated motion vectors 114A, B, C . . . . A special algorithm estimates the motion vectors 114A, B, C . . . for each of the blocks 112A, B, C . . . by searching the second video frame 130 for blocks 132A, B, C . . . resembling as closely as possible the blocks 112A, B, C . . . . Once the blocks 132A, B, C . . . are found, the corresponding motion vectors 114A, B, C . . . can be determined. In FIG. 1, only the motion vector 114C is shown entirely, for simplicity. After the motion vectors 114A, B, C . . . for each of the blocks 112A, B, C . . . of the first video frame 110 are estimated, the interpolated video frame 120 can be calculated by shifting the blocks 112A, B, C . . . by a fraction of the corresponding motion vectors 114A, B, C . . . , so as to obtain shifted blocks 122A, B, C . . . . The magnitude of the fraction depends on the time separation (for frame rate up-conversion), or the spatial separation (for view interpolation), between the first video frame 110 and the interpolated video frame 120. By way of example, if a video frame rate needs to be doubled, then the interpolated video frame 120 is interpolated "in the middle", that is, the blocks 122A, B, C . . . are shifted by one half of a shift represented by the motion vectors 114A, B, C . . . .

A motion field formed by the motion vectors 114A, B, C . . . is called unidirectional because all motion vectors 114A, B, C . . . pass through the interpolated video frame 120 in one direction. The motion vectors 114A, B, C . . . are associated with the blocks 112A, B, C . . . that are contiguous in the first video frame 110. After motion compensation, the blocks 122A, B, C . . . may not be contiguous in the interpolated video frame 120, which causes two problems.

Figures 2A, 2B:
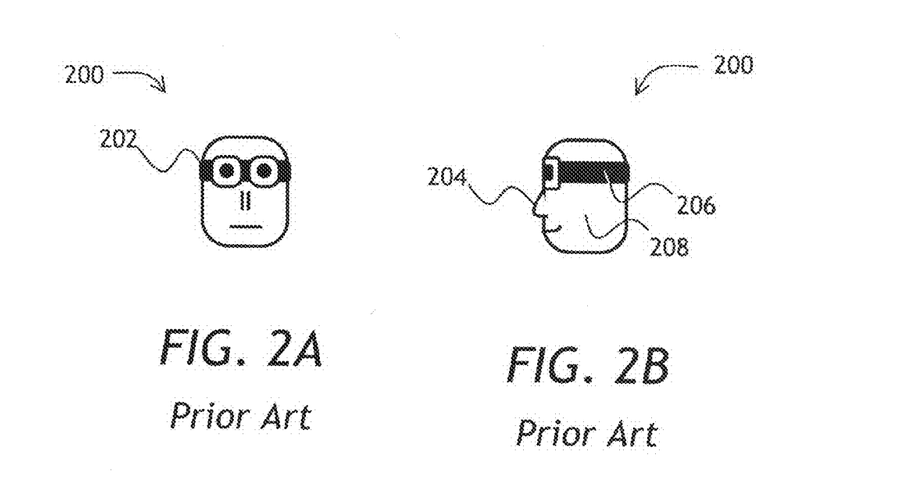
FIGS. 2A and 2B are illustrations of occlusions in frontal and side views, respectively, of a head of a fictitious cartoon character wearing goggles.

The first problem is related to so called holes and overlaps. For example, an area 125 of the interpolated video frame 120 is an area of overlap of blocks 122C and 122B. In other words, pixels in the overlap area 125 have multiple motion vectors passing through them. Pixels in a hole area 127 have no motion vectors passing through them. The hole area 127 and the overlap area 125 can be created due to motion estimation errors, or they can be created due to so called occlusions. The term "occlusion" refers to the appearance of new objects and disappearance of existing objects when comparing the first video frame 110 and the second video frame 130. By way of example, referring to FIGS. 2A and 2B, occlusions are illustrated by means of frontal and side views, respectively, of a head 200 of a fictitious cartoon character wearing goggles 202. When the head 200 is turned sideways as shown in FIG. 2B, a profile of a nose 204 appears, while a frontal view of the nose disappears as shown at 208. At the same time, one of the eyes also disappears, as shown at 206. The areas 204, 206, and 208 are termed occluded areas. The motion vectors, not shown, in the occluded areas 204, 206, and 208, could not be properly estimated, because to estimate a motion vector, a block similar to a block of the first video frame 110 has to be found in the second video frame 130. The occluded areas 204, 206, and 208 are dissimilar in the first and the second video frames 110 and 130; therefore, the motion vectors for these areas cannot be properly estimated.

The second problem is the appearance of so called blocking artifacts. Referring back to FIG. 1, a line 111 present in the first video frame 110 is broken at locations 121 in the intermediate video frame 120 as a result of the block-wise interpolation described above. Broken lines, and the blocking visual defects in general, are easily noticeable by a human vision system and therefore are highly detrimental.

A number of algorithms have been proposed to handle holes, overlaps, and blocking artifacts. In one approach, image and motion field segmentation is used. For example, Huang et al. in an article entitled "Motion-compensated interpolation for scan rate up-conversion," *Optical Engineering*, vol. 35, No. 1, pp. 166-176, January 1996, incorporated herein by reference, disclose an approach based on image and motion field segmentation. In another approach, a depth order of objects is determined and used to handle overlaps. For example, Wang et al. in U.S. Pat. No. 6,625,333, incorporated herein by reference, disclose using the depth order to handle overlaps.

Benois-Pineau et al. in an article entitled "A new method for region-based depth ordering in a video sequence: application to frame interpolation," *Journal of Visual Communication and Image Representation*, vol. 13, pp. 363-385, 2002, which is incorporated herein by reference, disclose a median filter to fill hole areas such as the hole area 127 in FIG. 1. Bertalmio et al. in an article "Image inpainting," *Computer Graphics (SIGGRAPG* 2000), July 2000, pp. 417-424, which is incorporated herein by reference, disclose so called "image inpainting" to fill hole areas. Most of these algorithms are quite complex, because the overlaps and holes are usually irregular in shape and size.

Figure 3:
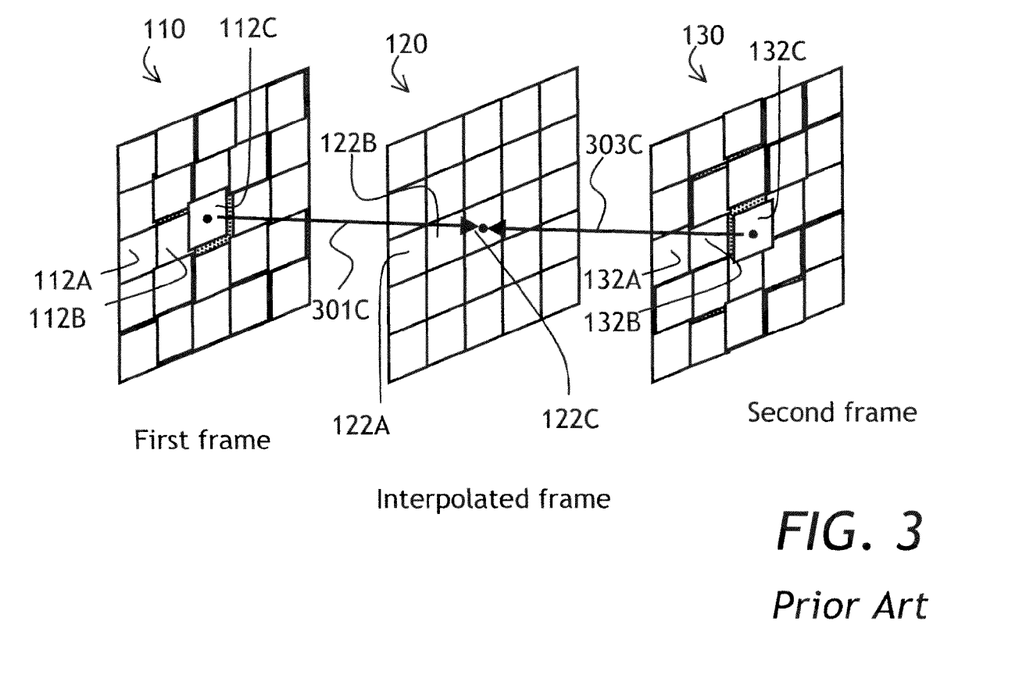
FIG. 3 is an exploded view of two images and an interpolated image therebetween formed using a prior-art bi-directional motion field.

To avoid the problems of holes and overlaps, a number of researchers have proposed to use so called bi-directional motion fields. Referring to FIG. 3, a prior-art bi-directional motion field approach is illustrated by means of the first video frame 110, second video frame 130, and the interpolated video frame 120. In the bi-directional motion field approach, the interpolated video frame 120 is created as an empty frame and is divided into the blocks 122A, B, C . . . , which are initially empty. For each of the blocks 122A, B, C . . . , two motion vectors are estimated, one corresponding to the shift of the blocks 122A, B, C . . . relative to the blocks 112A, B, C . . . of the first video frame 110, and the other corresponding to the shift of the blocks 122A, B, C . . . relative to the blocks 132A, B, C . . . of the second video frame 130. For example, for the block 122C, two motion vectors are estimated, 301C and 303C. The first motion vector 301C provides a magnitude and a direction of displacement of the corresponding block 112C of the first video frame 110 relative to the block 122C, and the second motion vector 303C provides a magnitude and a direction of displacement of the corresponding block 132C of the second video frame 130 relative to the block 122C. When all these vectors are known, the blocks 122A, B, C . . . can be filled with pixels from the blocks 112A, B, C . . . from the first video frame 110, shifted by corresponding motion vectors, as well as with pixels form the blocks 132A, B, C . . . from the second video frame 130, shifted by corresponding motion vectors. The pixel values transferred from the first video frame 110 and the second video frame 130 are then averaged using a weighted averaging method. The bi-directional motion field can be estimated using an algorithm disclosed by Choi et al. in an article entitled "New frame rate up-conversion using bi-directional motion estimation," *IEEE Trans. Consumer Electronics*, vol. 46, No. 3, pp. 603-609, August 2000, which is incorporated herein by reference. Alternatively, the bi-directional motion field can be derived from a unidirectional motion field as disclosed by Castagno et al. in an article entitled "A method for motion adaptive frame rate up-conversion," *IEEE Trans. Circuits and Systems for Video Technology*, vol. 6, No. 5, pp. 436-445, October 1996, which is incorporated herein by reference.

One apparent advantage of the bi-directional approach is that there is no need to handle holes and overlaps, since the blocks in the frame to be interpolated are contiguous. For the same reason, one can use overlapped block motion compensation (OBMC) disclosed by Kang et al. in an article entitled "Motion compensated frame rate up-conversion using extended bilateral motion estimation", *IEEE Trans. Consumer Electronics*, vol. 53, No. 4, pp. 1759-1767, November 2007, which is incorporated herein by reference. The OBMC can be used to reduce blocking artifacts in the interpolated image 120 divided into the contiguous blocks 122A, B, C . . . .

However, there are two essential performance problems associated with the bi-directional approach. The first problem is the difficulty to accurately estimate the bi-directional motion since the pixels within the block to be interpolated are not known. The second problem is the lack of information on occlusions. Occluded areas exist in only one of the two existing video frames 110 and 130 and, therefore, should be interpolated using only one of the video frames 110 and 130.

The prior art is lacking a method of image interpolation that would provide fast and accurate image interpolation while reducing undesirable effects of holes, overlaps, and blocking artifacts in the interpolated image. Accordingly, it is an object of the invention to provide such a method.

SUMMARY OF THE INVENTION

In accordance with the invention there is provided a new unidirectional motion-compensated frame interpolation method that addresses the problems of blocking artifacts, overlaps, and holes. Unidirectional motion field provides more accurate estimation of motion trajectories and information on occlusions than a bi-directional motion field. To reduce the blocking artifacts and solve the problem of holes and overlaps associated with a unidirectional motion field, the individual blocks of pixels are expanded and weighted before applying the unidirectional motion field. To fill holes, a new directional hole interpolation method is used. The advantages of these methods are their simplicity and effectiveness.

In accordance with the invention there is provided a method for image interpolation between first and second images, comprising:

(a) dividing the first image into contiguous blocks of pixels;

(b) obtaining a forward motion field from the first image to the second image, wherein the forward motion field includes a plurality of motion vectors, wherein each motion vector corresponds to a displacement of a particular one of the blocks of step (a) in going from the first image to the second image;

(c) expanding boundaries of the blocks of step (a) for an overlap therebetween, and weighting pixel values of thus expanded blocks using a pre-defined weight matrix;

(d) applying the forward motion field of step (b) to the pixel value weights of the expanded blocks of step (c), so as to obtain a two-dimensional matrix of cumulative pixel value weights for a first interpolated image;

(e) applying the forward motion field of step (b) to the pixel values of the expanded blocks of step (c), so as to obtain a two-dimensional matrix of cumulative pixel values for the first interpolated image; and (f) computing the first interpolated image by dividing cumulative pixel values by corresponding cumulative pixel value weights for each pixel of the first interpolated image.

In one embodiment, the second image is also divided into contiguous blocks of pixels, and a second interpolated image is computed by performing steps (b) through (f) above using a backward motion field from the second image to the first image, wherein the backward motion field includes a plurality of motion vectors, wherein each motion vector corresponds to a displacement of a particular one of the blocks of the second image in going from the second image to the first image. Then, the first and the second interpolated images are combined, preferably using weighted averaging. As a result of combining the images, the hole areas are reduced.

In one embodiment of the invention, the first and the second images are represented by two-dimensional matrices $F_1(i,j)$ and $F_2(i,j)$, respectively, of pixel values;

wherein in step (d), the two-dimensional matrix of cumulative pixel value weights is obtained using the formula $\omega(i+\tau x_B, j+\tau y_B) += w(i-i_0, j-j_0)$;

wherein in step (e), the two-dimensional matrix of cumulative pixel values is obtained using the formula $\zeta(i+\tau x_B, j+\tau y_B) += w(i-i_0, j-j_0)[(1-\tau)F_1(i,j)+\tau F_2(i+x_B, j+y_B)]$; and wherein in step (f), the first interpolated image is computed as $$F_f(i, j) = \begin{cases} \zeta(i, j)/\omega(i, j), & \text{if } \omega(i, j) > 0 \\ H_f, & \text{otherwise;} \end{cases}$$

wherein i, j are pixel coordinates; $i_0$, $j_0$ are pixel coordinates of a first pixel of an expanded block $B_E$ of the expanded blocks of step (c); += denotes accumulation over the expanded blocks of step (c); $(x_B, y_B)$ is a motion vector of the forward motion field of step (b), the motion vector $(x_B, y_B)$ corresponding to the expanded block $B_E$; $\tau$ is a separation between the first image and the first interpolated image divided by a separation between the first and the second images; $H_f$ is a constant corresponding to an undetermined pixel (a hole) in the first interpolated image $F_f(i,j)$; and w(x,y) is the pre-defined two-dimensional weight matrix of step (c).

Methods of the invention can be used for motion-compensated video frame interpolation, as well as for a view reconstruction and/or depth adjustment for a stereoscopic video.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Description of Methods of the Invention

Figure 4A:
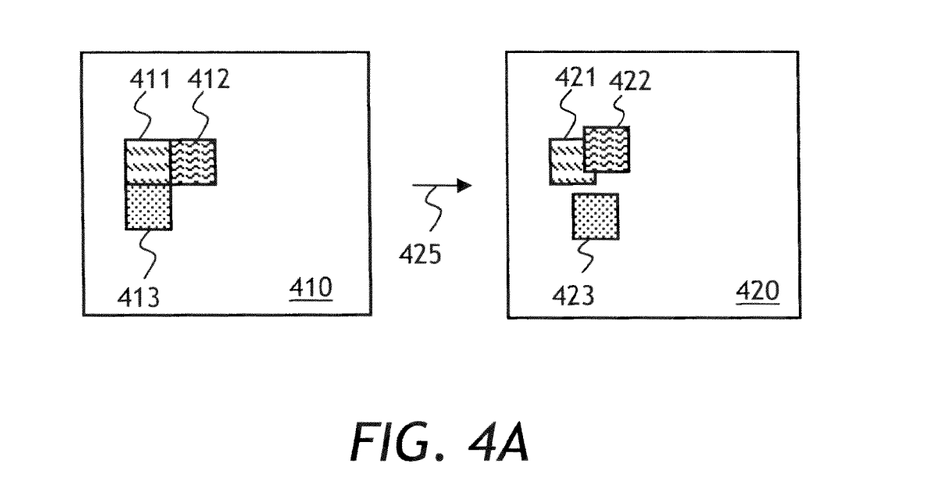
FIGS. 4A and 4B are plan views of unexpanded and expanded blocks of pixels, respectively, in original and interpolated images.

As noted above, a method of image interpolation of the invention is based on unidirectional motion fields between first and second images. Referring to FIG. 4A, a first image 410 is divided into contiguous blocks 411, 412, 413 . . . of pixels. Then, a forward motion field 425 in going from the first image 410 to a second image, not shown, is obtained using any suitable method of prior art. The forward motion field 425 includes a plurality of motion vectors, not shown. Each motion vector corresponds to a displacement of a particular one of the blocks 411, 412, 413 . . . in going from the first image 410 to the second image, so as to obtain shifted blocks 421, 422, 423 . . . of an interpolated image 420.

Figure 4B:
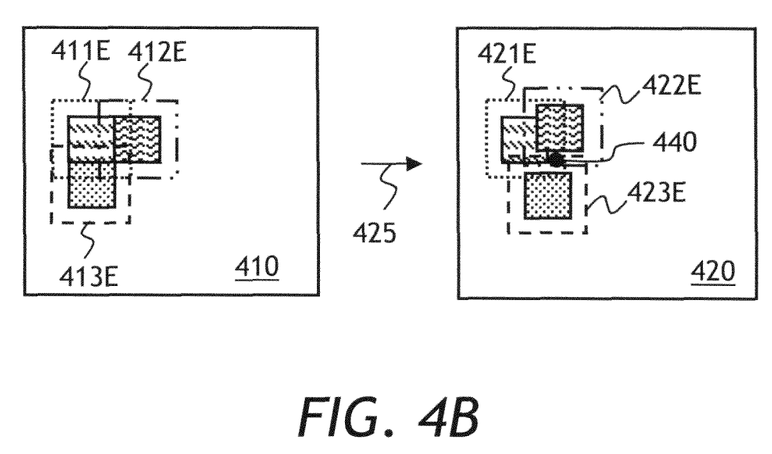

In accordance with the invention, boundaries of the blocks 411, 412, 413 . . . are expanded for an overlap therebetween. Referring now to FIG. 4B, expanded blocks 411E, 412E, 413E . . . of the first image 410 are shown in dashed, dotted, and dashed-double-dotted lines, respectively. Each pixel of each of the expanded blocks 411E, 412E, 413E . . . is weighted in dependence upon a position of the pixel in the block, using a pre-defined weight matrix having a size of the expanded blocks 411E, 412E, 413E . . . of pixels. Then, the forward motion field 425 is applied to the expanded blocks 411E, 412E, 413E . . . , so as to obtain shifted expanded blocks 421E, 422E, 423E . . . shown in dashed, dotted, and dashed-double-dotted lines, respectively. Pixel value weights are accumulated in the interpolated image 420, so as to obtain a two-dimensional matrix of the accumulated pixel value weights. The two-dimensional matrix of weights has the same size as the interpolated image 420.

At a next step, the forward motion field 425 is applied to the pixel values of the expanded blocks 411E, 412E, 413E . . . , so as to obtain a two-dimensional matrix of cumulative pixel values for the interpolated image 420. The two-dimensional matrix of pixel values has the same size as the interpolated image 420. Finally, the interpolated image 420 is computed by dividing cumulative pixel values by corresponding cumulative pixel value weights for each pixel of the interpolated image 420. Dividing the cumulative pixel values by weights allows one to avoid bright spots in areas of multiple overlaps of the expanded blocks 421E, 422E, 423E . . . , such as an area 440, for example. The image interpolation obtained by applying a unidirectional motion field to expanded weighted blocks is termed herein "the irregular-grid expanded-block weighted motion compensation", or IEWMC.

Figure 5:
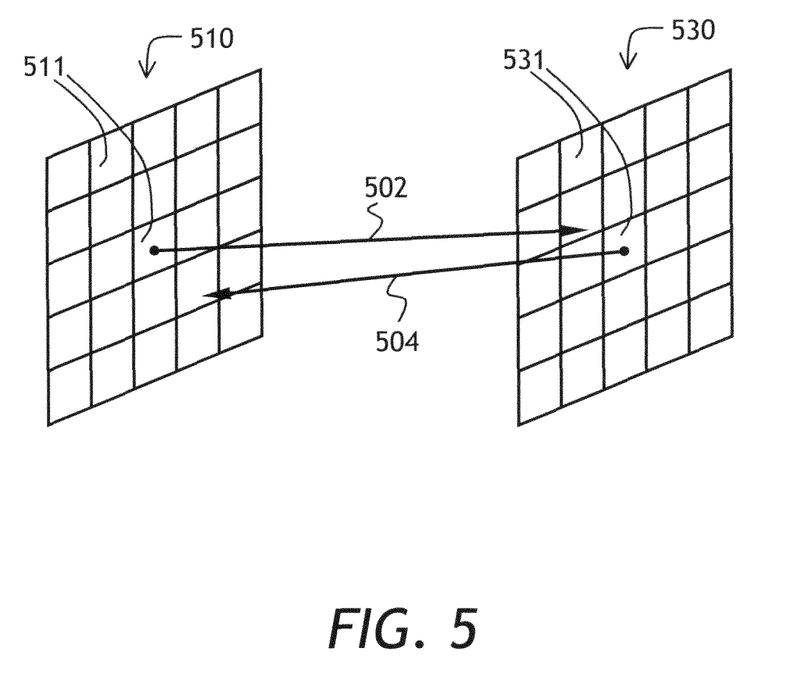
FIG. 5 is an exploded view of two images and corresponding forward and backward motion fields according to the invention.

In one embodiment of the invention, the IEWMC procedure is performed twice, once in a forward direction from a first image to a second, and once in a backward direction, from the second image to the first. Turning to FIG. 5, first and second images 510 and 530 are shown. The first image 510 corresponds to the first image 410 of FIG. 4B. The IEWMC in the forward direction is performed by dividing the first image 510 of FIG. 5 into blocks 511 and applying forward motion vectors 502 (only one forward motion vector 502 is shown). Similarly, to perform the IEWMC in the backward direction, the second image 530 is divided into blocks 531 and the IEWMC procedure is repeated using a backward motion field from the second image 530 to the first image 510. The backward motion field includes a plurality of motion vectors, such as a backward motion vector 504, for example. Each backward motion vector corresponds to a displacement of a particular one of the expanded blocks, not shown, of the second image 530 in going from the second image 530 to the first image 510.

The forward and backward-interpolated images are then combined into a single interpolated image. Preferably, a weighted averaging is used to combine the images. Pixel values of the forward-interpolated image are weighted in dependence upon a difference between corresponding pixel values of the second image 530 and an image obtained by applying the forward motion field to the first image 510 all the way to the second image 530. Similarly, pixel values of the backward-interpolated image are weighted in dependence upon a difference between corresponding pixel values of the first image 510 and an image obtained by applying the backward motion field to the second image 530 all the way to the first image 510.

As noted above, using unidirectional motion fields can result in appearance of holes and overlaps. Using expanded weighted blocks, such as the expanded weighted blocks 411E, 412E, 413E . . . of FIG. 4B, results in considerable reduction of number and magnitude of these defects. Occasionally, holes can be formed even when the expanded weighted blocks 411E, 412E, 413E . . . are used. When the forward-interpolated image includes a hole having at least one undetermined pixel, the combined interpolated image can use non-hole pixels of the backward-interpolated image to fill the hole. When both forward-interpolated and backward-interpolated images have holes at the same location, the combined interpolated image will have a hole at that location, as well.

When the combined interpolated image has a hole, that hole can be filled using values of pixels disposed outside the hole. Prior-art methods rely on extensive averaging or smoothing to fill holes. These methods result in appearance of blurred areas in the interpolated image at location of the holes. According to the invention, the holes can be filled by performing a block-wise directional hole interpolation.

Figure 6:
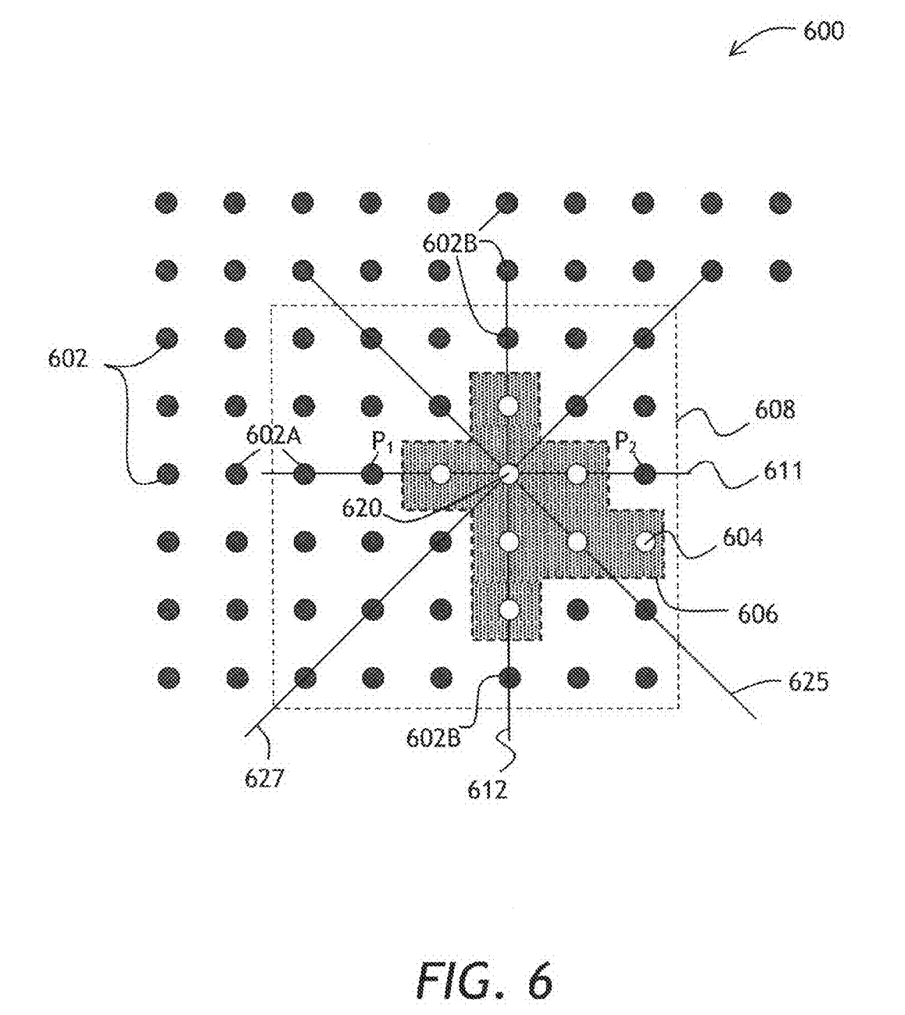
FIG. 6 is a plan view of holes in a combined image before a directional interpolation of the invention is applied to fill the holes.

Referring to FIG. 6, a combined interpolated image 600 is shown. The combined interpolated image 600 has pixels 602 having determined values and pixels 604 having undetermined values. The undetermined pixels 604 form an area of a hole 606.

At a first step of directional interpolation, the combined interpolated image is divided into contiguous hole interpolation blocks, such as a hole interpolation block 608 including the hole 606. The hole interpolation blocks are not necessarily of the same size as the size of the blocks 511 used in the image interpolation.

At a second step, averages of absolute differences between values of adjacent pixels 602A and 602B disposed along first and second mutually orthogonal horizontal and vertical lines 611 and 612, respectfully, are calculated. The mutually orthogonal lines 611 and 612 cross at a pixel 620 disposed within the hole 606. The adjacent pixels 602A and 602B are disposed within or no more than two pixels away from the hole interpolation block 608 and outside the hole 606.

At a third step, pixels of the hole 606 are assigned values derived from the values of the pixels 602 around the hole 606. For example, the pixel 620, disposed at the crossing of the mutually orthogonal lines 611 and 612, is assigned a value derived from a value of at least one pixel 602A or 602B disposed on the mutually orthogonal lines 611 and 612, respectively. The derived values are weighted by a reciprocal of the averages calculated in the second step above. The procedure is repeated for each remaining hole pixel 604. Weighting the interpolated values by a reciprocal of the adjacent pixel value differences will ensure that the interpolation will not blur existing sharp edges. For example, if a sharp edge is present in the combined interpolated image 600 and is disposed along the horizontal line 611, the adjacent pixels 602B disposed along the vertical line 612 will have large difference in luminosity values. Accordingly, the pixels 602B disposed along the vertical line 612 above and below the hole 606 will not contribute significantly to the hole pixels 606, and the sharp horizontal edge along the horizontal line 611 will be preserved. Pixels $P_1$ and $P_2$ disposed on the horizontal line 611 on both sides of the hole 606 will contribute significantly to the interpolation.

To account for cases when the sharp edges are disposed diagonally, the averaging procedure can account for averaged values of pixels disposed along diagonal lines 625 and 627. The diagonal lines 625 and 627 will be perpendicular to each other when the pixel spacing of the pixels 602 is the same in horizontal and vertical directions, as shown in FIG. 6.

Figure 7:
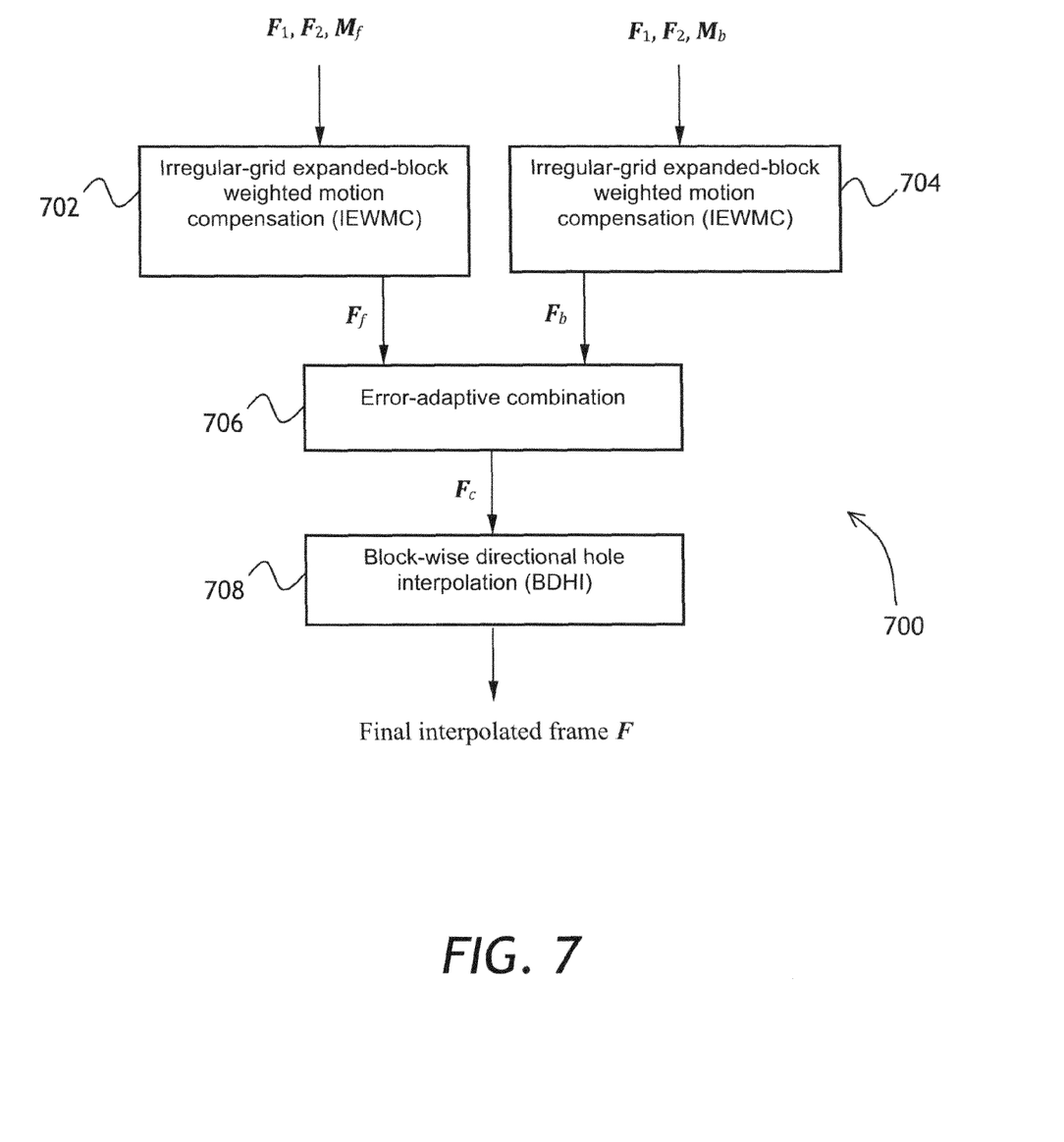
FIG. 7 is a block diagram of a preferred method of image interpolation according to the invention.

Referring now to FIG. 7, a preferred method 700 of image interpolation of the invention includes the above described methods of IEWMC interpolation and block-wise directional hole interpolation. Specifically, the method 700 includes performing IEWMC interpolation 702 and 704 between images $F_1$ and $F_2$ in forward and backward directions using motion fields $M_f$ and $M_b$, respectively; error-adaptive combination 706 of interpolated images $F_f$ and $F_b$ generated by the IEWMC interpolation steps 702 and 704; and block-wise directional, hole interpolation 708 of the resulting combined interpolated image $F_c$ to eliminate holes in the combined interpolated image $F_c$, corresponding to the combined interpolated image 600 of FIG. 6, and obtain the final interpolated image F.

Mathematical Illustration of Methods of Image Interpolation

Methods of image interpolation of the invention will now be illustrated by means of mathematical formulas defining the forward-interpolated image $F_f$, the backward-interpolated image $F_b$, the combined interpolated image $F_c$, and the final interpolated image F.

A. Irregular-Grid Expanded-Block Weighted Motion-Compensation (IEWMC)

Application of IEWMC to computation of the forward-interpolated image $F_f$ will now be described. The forward-interpolated intermediate image $F_f$ is created using the forward motion field $M_f$. Suppose that the normalized time separation between the first frame $F_1$ and the intermediate image $F_f$ is $\tau$, and between $F_f$ and the second frame $F_2$ it is $1-\tau$. Let $(i, j)$ stand for the spatial coordinates of a pixel and $m_B=(x, y)$ a motion vector associated with block B. The conventional unidirectional MCFI can be described as:

$$F_f(i+\tau x, j+\tau y) = (1-\tau)F_1(i,j) + \tau F_2(i+x, j+y), \text{for}(i,j) \in B \quad (1)$$

If the block is occluded, that is, the pixels within block B in the first frame $F_1$ have no correspondence in the second frame $F_2$, then $F_f$ should be created using only $F_1$:

$$F_f(i+\tau x, j+\tau y) = F_1(i,j), \text{for}(i,j) \in B \quad (2)$$

The interpolated pixels $F_f(i+\tau x, j+\tau y)$ resulting from the motion vector $m_B$ may overlap those resulting from other motion vectors, as illustrated at 440 in FIG. 4B. When this occurs, the conventional motion-compensation frame interpolation (MCFI) usually selects the interpolation value that has the smallest motion compensation difference $|F_1(i,j)-F_2(i+x, j+y)|$. A problem with this approach is that it leads to abrupt transitions between pixels resulting from one motion vector and those pixels from other motion vectors. These abrupt transitions may appear as blocking artifacts, such as the blocking artifacts 121 in FIG. 1, which, as noted above, are very perceptible by the human visual system.

With the IEWMC, each block is expanded in four directions. For example, blocks of 4×4 pixels are expanded to blocks of 8×8 pixels. Referring back to FIG. 4B, three expanded blocks 421E, 422E, and 423E are irregularly spaced because of motion compensation. Their locations in the interpolated frame 420 depend on their corresponding motion vectors. Within each expanded block 421E, 422E, and 423E, the contribution of the motion compensation to the interpolated image is weighted by a pre-determined weighting matrix w(x, y) with a size equal to the size of each expanded block 421E, 422E, and 423E. The value of a pixel in the interpolated image $F_f$ is a weighted average of all the contributions to that pixel. The weights in matrix w(x, y) vary with the spatial location within the expanded block 421E, 422E, or 423E. Generally, the weights decrease from the largest value at the center of the matrix to a minimum value at the boundary. The weighted average results in a smooth transition between pixels. The following is an example integer weight matrix that is obtained using a bilinear function:

$$w(x, y) = \begin{bmatrix} 0 & 1 & 1 & 2 & 2 & 1 & 1 & 0 \\ 1 & 2 & 4 & 5 & 5 & 4 & 2 & 1 \\ 1 & 4 & 6 & 9 & 9 & 6 & 4 & 1 \\ 2 & 5 & 9 & 12 & 12 & 9 & 5 & 2 \\ 2 & 5 & 9 & 12 & 12 & 9 & 5 & 2 \\ 1 & 4 & 6 & 9 & 9 & 6 & 4 & 1 \\ 1 & 2 & 4 & 5 & 5 & 4 & 2 & 1 \\ 0 & 1 & 1 & 2 & 2 & 1 & 1 & 0 \end{bmatrix}$$

As the location of the expanded blocks 421E, 422E, and 423E in the interpolated image depends on the corresponding motion vector, it is possible for any motion vector to contribute to a given pixel in the interpolated image 420. Thus, to know the coefficients of the weighted average, the motion compensation from all the motion vectors has to be done. This is different from the conventional overlapped block motion compensation (OBMC), whereby the blocks in the interpolated image are regularly spaced and the coefficients of the weighted average are pre-defined. Since the coefficients of the weighted average are unknown until the motion compensations from all the motion vectors have been done, the IEWMC has to be performed in two passes. In the first pass, the motion compensation is carried out block by block and the weights of the motion compensations for each interpolated pixel are accumulated. The second pass normalizes the motion compensations for every interpolated pixel. A weighted average $E_f(i, j)$ of the motion compensation differences is also computed; it can be used in the error-adaptive combination step 706 of FIG. 7. Accordingly, the IEWMC is implemented in the following three steps:

(i) Initialization: Initialize a memory for three images $\zeta(i, j)$, $\omega(i,j)$, and $\epsilon(i,j)$ for calculating the accumulations of the weighted motion compensations, the weights, and the weighted motion compensation differences, respectively. Set all pixels in these images to zero.

(ii) Accumulations: Compute the motion compensations using one motion vector after another, multiply the motion compensations with the corresponding weights, and accumulate the weighted motion compensations, the weights, and the weighted motion compensation differences.

Again, let $B_E$ denote an expanded block, $(i_0, j_0)$ the spatial position of the first pixel (that is, the pixel at the upper-left corner) within the block $B_E$, $(x_B, y_B)$ the motion vector associated with $B_E$, and $\tau$ the normalized time separation between frames $F_1$ and $F_f$. The accumulations can be represented as follows:

$$\zeta(i+\tau x_B, j+\tau y_B) \mathrel{+}= w(i-i_0, j-j_0)[(1-\tau)F_1(i,j)+\tau F_2(i+x_B, j+y_B)] \quad (3)$$

$$\epsilon(i+\tau x_B, j+\tau y_B) \mathrel{+}= w(i-i_0, j-j_0)|F_1(i,j)-F_2(i+x_B, j+y_B)| \quad (4)$$

$$\omega(i+\tau x_B, j+\tau_B) \mathrel{+}= w(i-i_0, j-j_0) \quad (5)$$

where $(i, j) \in B_E$ and the symbol += means that the value calculated on the right-hand side of an equation is added to the value on the left-hand side of the equation. This symbol is used in some computer programming languages, such as C and C++. If a block is occluded, Equation (3) changes to:

$$\zeta(i+\tau x_B, j+\tau y_B) \mathrel{+}= w(i-i_0, j-j_0)F_1(i,j) \quad (6)$$

This is the first pass of the IEWMC, carried out from the first motion vector to the last motion vector. At the end of this pass, $\zeta(i,j)$ is the sum of the weighted motion compensations with all the motion vectors that contribute to the pixel at (i,j) through expanded blocks. $\epsilon(i,j)$ is the sum of the weighted motion compensation differences, and $\omega(i,j)$ is the sum of the weights.

(iii) Normalization: Since the sum $\omega(i,j)$ of the weights for a pixel may not be the same, the sums $\zeta(i,j)$ and $\epsilon(i,j)$ calculated in step (ii) need to be normalized to obtain the interpolated image $F_f(i,j)$ and the weighted average $E_f(i,j)$ of the motion compensation differences. This is the second pass of the IEWMC, carried out one pixel after another as follows:

$$F_f(i, j) = \begin{cases} \zeta(i, j)/\omega(i, j), & \text{if } \omega(i, j) > 0 \\ H, & \text{otherwise} \end{cases} \quad (7)$$

$$E_f(i, j) = \varepsilon(i, j)/\omega(i, j), \quad \text{if } \omega(i, j) > 0 \quad (8)$$

where H is a constant indicating that the pixels are within holes. If coli, $\omega(i,j)=0$, motion compensation does not contribute to the pixel at (i, j). This pixel is deemed to be inside a hole caused by occlusion or by a motion estimation error.

B. Error Adaptive Combination

The intermediate images $F_f$ and $F_b$ are combined into one image $F_c$ to reduce the area of the holes and increase the image quality. $F_b$ and $E_b$ are calculated following the process described in the previous subsection, except that the backward motion field $M_b$ is used and, therefore, Equations (3)-(6) change accordingly.

Generally, the quality of $F_f(i, j)$ and $F_b(i, j)$ in the areas other than the holes can be roughly measured by the normalized motion compensation differences $E_f(i, j)$ and $E_b(i, j)$, respectively. Thus, the combination of $F_f(i, j)$ and $F_b(i, j)$ should be based on the values of $E_f(i, j)$ and $E_b(i, j)$. Based on experimental results with a large number of video sequences, the following error-adaptive combination provides the best image quality:

$$F_c(i, j) = \begin{cases} \frac{E_b(i, j) + \alpha}{E_f(i, j) + E_b(i, j) + 2\alpha} F_f(i, j) + \frac{E_f(i, j) + \alpha}{E_f(i, j) + E_b(i, j) + 2\alpha} F_b(i, j), & \text{if } F_f(i, j) \neq H \text{ and } F_b(i, j) \neq H \\ F_f(i, j), & \text{if } F_f(i, j) \neq H \text{ and } F_b(i, j) = H \\ F_b(i, j), & \text{if } F_f(i, j) = H \text{ and } F_b(i, j) \neq H \\ H & \text{otherwise} \end{cases}$$

wherein the first line on the right-hand side is a weighted average of the two pixels from $F_f(i, j)$ and $F_b(i, j)$. The weights are determined by the normalized motion compensation differences $E_f(i, j)$ and $E_b(i, j)$. $\alpha$ is an empirically selected pre-determined parameter used to smooth the weights and to avoid the combination being too sensitive to small values of $E_f(i, j)$ or $E_b(i, j)$. In our experiments, a is set to 8.

C. Block-Wise Directional Hole Interpolation

After the error-adaptive combination, image $F_c(i, j)$ may still contain holes that need to be filled, as designated by pixels with an assigned value of H. The undetermined pixels in the holes cannot be interpolated using motion compensation because the motion for these pixels is not available. These pixels should be constructed using the spatial information provided by the interpolated pixels around the holes. Benois-Pineau et al. in the abovementioned article "A new method for region-based depth ordering in a video sequence: application to frame interpolation" discloses a median filter repeatedly applied to the undetermined pixels until all holes were filled. Wang et al. in the abovementioned U.S. Pat. No. 6,625,333 discloses linear spatial interpolations used to fill the holes. These methods have the following two shortcomings. First, they are not well suited for hardware implementation and real-time applications, although they are easily implemented in software. The shape and size of the holes are arbitrary and depend on the image content and motion. The number of calculations required to fill the holes varies with the shape and size of the holes. The second shortcoming is that these methods do not take into account the local orientation of the edges and textures in the image and, therefore, make the filled areas blurry.

The basic idea behind the block-wise directional hole interpolation (BDHI) method of the invention is to divide $F_c$ into blocks, analyze the orientation of the edges and texture within each block, and interpolate the holes block by block according to the orientation.

Specifically, in the BDHI method, the image $F_c$ is divided into blocks of size N×N. This size is not necessarily the same as a block size used for motion estimation. In the BDHI method, the blocks are examined one by one in the scanning order. Referring again to FIG. 6, for each block 608 that contains the undetermined pixels 604, averages of the absolute differences between adjacent interpolated pixels 602A and 602B in each of the horizontal and vertical directions represented by lines 611 and 612, respectively, and optionally the two diagonal directions indicated by diagonal lines 625 and 627 within the block 608, are calculated. For example, for the horizontal direction, the average value of $|F_c(i,j)-F_c(i,j-1)|$ is calculated for all interpolated pixels within the block, excluding the undetermined pixels. The four average absolute differences, denoted by $a_h$, $a_v$, $a_d$, and $a_r$ respectively, are used to represent the sharpness of the edges and the variation of the texture in these directions. If there are too few interpolated pixels within the block, the pixels in the two rows above the block and those in the two columns on the left of the block are included in the calculation of the absolute differences. In general, a large average absolute difference in a given direction indicates that there are sharp edges crossing this direction. As noted above, to preserve sharp edges in the image 600, pixels crossing sharp edges should have little effect on the interpolation of the undetermined pixels, whereas pixels along edges should have a strong effect on the interpolation.

For each undetermined pixel 604 within the block 608, the BDHI method then carries out the linear interpolations $p_h$, $p_v$, $p_d$, and $p_r$ in the horizontal, vertical, and the two diagonal directions shown by the horizontal, vertical, and two diagonal lines 611, 612, 625, and 627 in FIG. 6. Each of the linear interpolations uses the two closest interpolated pixels that are on the line in the corresponding direction. For example, the linear interpolation $p_h$ in the horizontal direction uses the two interpolated pixels $P_1$ and $P_2$ in the same row as the undetermined pixel 620, as shown FIG. 6. One pixel $P_1$ is on the left side of the undetermined pixel, while the other pixel $P_2$ is the other on the right side. Let $d_1$ denote the spatial separation between $P_1$ and the undetermined pixel 620, and $d_2$ that between $P_2$ and the undetermined pixel 620. Then $p_h$ is computed as:

$$p_h = \begin{cases} \frac{d_2}{d_1 + d_2} p_1 + \frac{d_1}{d_1 + d_2} p_2, & \text{if both } p_1 \text{ and } p_2 \text{ exist} \\ p_1, & \text{if only } p_1 \text{ exists} \\ p_2, & \text{if only } p_2 \text{ exists} \end{cases}$$

If both $P_1$ and $P_2$ do not exist, the corresponding interpolation is not performed. It should be noted that $P_1$ and $P_2$ are limited to be within the block, on the row above the block, or on the column on the left of the block in order to reduce the computation complexity and to better exploit the local edge orientation.

After the linear interpolations, the BDHI method calculates the weighted average of the two interpolations $p_h$ and $p_v$, or all four interpolations $p_h$, $p_v$, $p_d$, and $p_r$ and assigns it to the undetermined pixel 620. As discussed above, the weights are proportional to the reciprocals of the average absolute differences $a_h$, $a_v$, $a_d$, and $a_r$. With these weights, the interpolation in the direction that does not cross edges has a larger effect than that in the direction that crosses sharp edges. Therefore, the undetermined pixel is filled with the following value:

$$p = \frac{1}{A}\left(\frac{1}{a_h}p_h + \frac{1}{a_v}p_v + \frac{1}{a_d}p_d + \frac{1}{a_r}p_r\right),$$

where $A = \frac{1}{a_h} + \frac{1}{a_v} + \frac{1}{a_d} + \frac{1}{a_r}$.

The BDHI method has two advantages that come from its "block-wise" and "directional" attributes. The first advantage is that large holes of arbitrary size and shape are divided into small blocks of known size and shape. Thus, the number of the required calculations is reduced and easy to control. The second advantage is that the information on local edges and texture can be extracted and used in the interpolation to get better image quality.

The above described methods of unidirectional motion-compensated frame interpolation were compared to existing methods by performing image interpolation of standard videos that are widely used in image processing experiments. These are Flower Garden, Mobile & Calendar, Foreman, Football, Bicycle, Coast Guard, Ferris Wheel, and Table Tennis. The first four test sequences have a spatial resolution of 352×288 pixels, while the last four have a spatial resolution of 352×240 pixels. All the test sequences have a frame rate of 30 frames per second and each of them consists of 101 frames. To quantitatively measure the quality of the interpolated images, the 50 odd frames were removed and 50 new odd frames were interpolated from the 51 even frames. Then, the average peak signal-to-noise ratio (PSNR) of the interpolated frames with respect to the original odd frames has been computed.

Experimental Results

Figure 8:
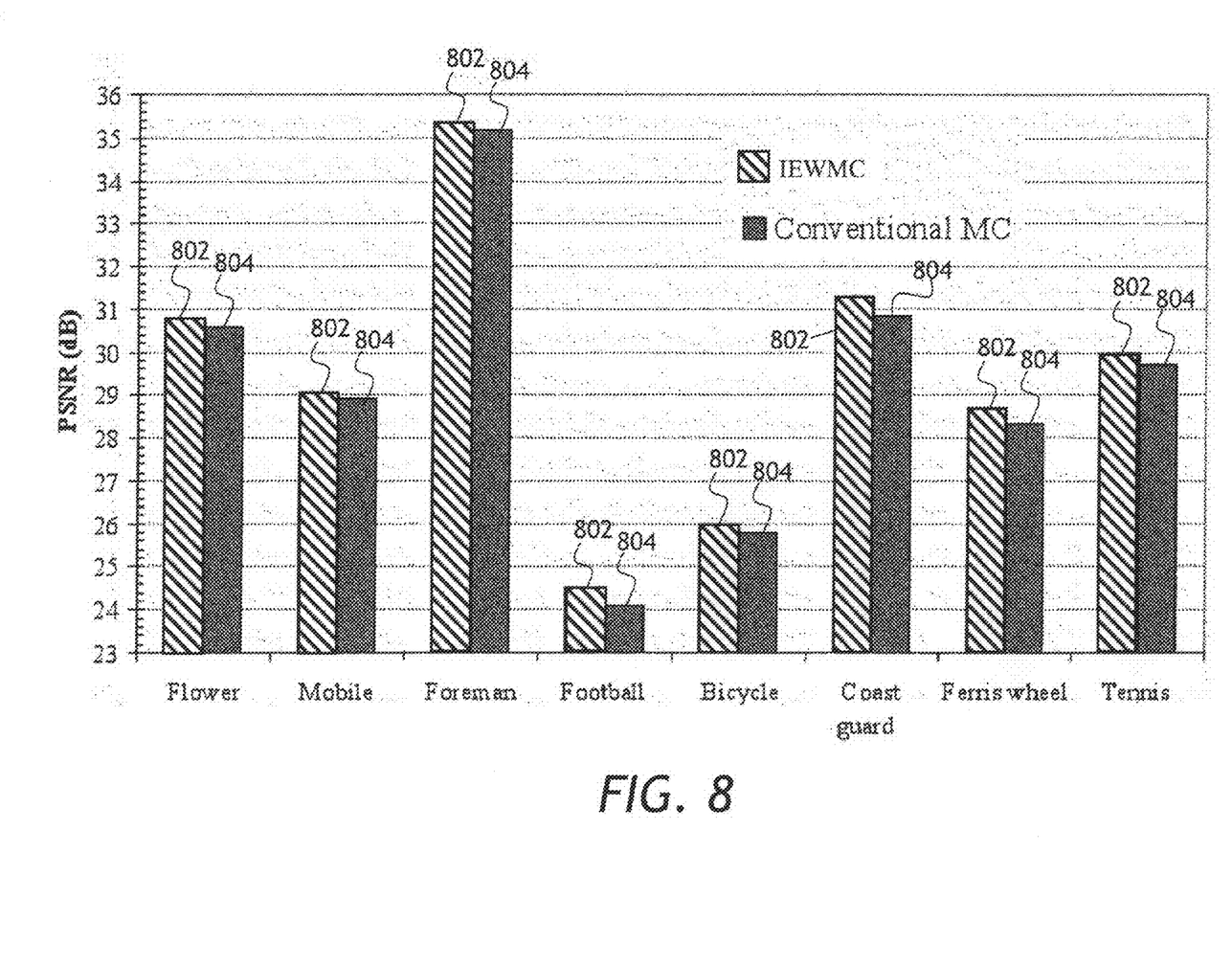
FIG. 8 is a bar graph comparing results of applying conventional method and a method of the invention to motion compensation to eight standard video sequences.
Figure 9A:
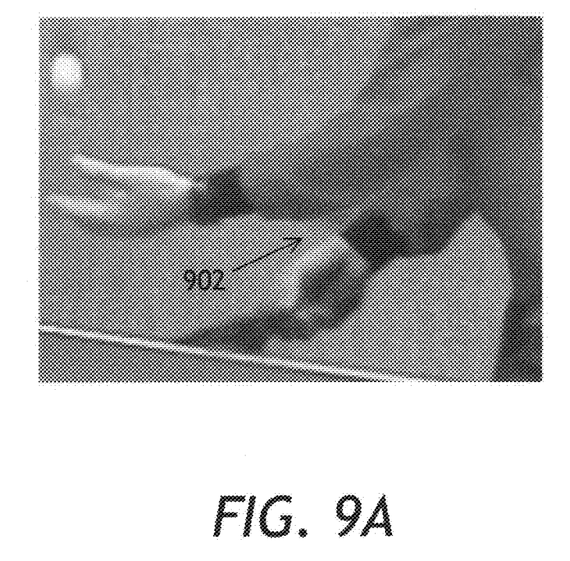
FIGS. 9A and 9B are interpolated color images obtained using a method of the invention and a prior-art method, respectively.
Figure 9B:
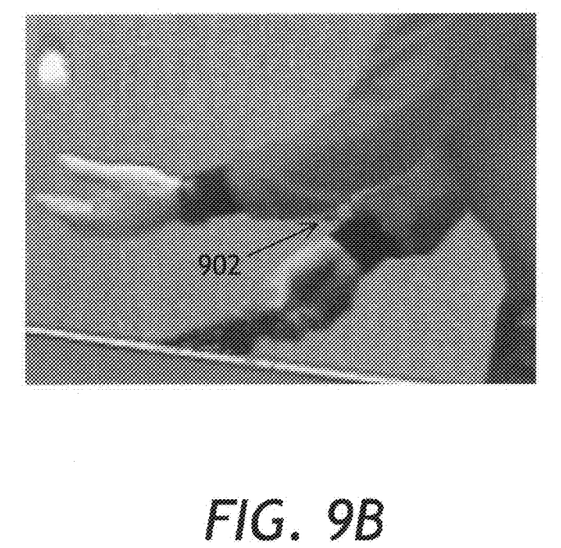

The performance of the IEWMC method of the invention has been compared with the performance of a conventional unidirectional motion-compensated frame interpolation (MCFI) of FIG. 1. The performance of the BDHI method of the invention has been compared with the performance of the repeated median filter method used by Benois-Pineau et al. in the abovementioned article "A new method for region-based depth ordering in a video sequence: application to frame interpolation". Referring now to FIG. 8, the average PSNR of the interpolated frames obtained using the proposed IEWMC method, and the conventional MCFI, are displayed at 802 and 804, respectively. Results in FIG. 8 indicate that the IEWMC method of the invention outperforms the conventional MCFI method for all eight test sequences. The average PSNR over all the sequences obtained using the IEWMC is 0.3 dB higher than that obtained using the conventional MCFI. The IEWMC generally produces smoother images. In contrast, the conventional MCFI may create sharp transitions and blocking artifacts to which the human visual perception is very sensitive. Referring now to FIG. 9, this difference is illustrated using a portion of a frame from the sequence Table Tennis. In the area 902 between the arms, this difference is clearly seen.

After the IEWMC and error-adaptive combination, there are still holes, but in only two of the eight test sequences: Football and Table Tennis. The IEWMC method significantly reduces the hole areas, as compared with the conventional MCFI. The total hole area is reduced from 31,150 pixels to 2,418 pixels for Football and from 2,244 pixels to 60 pixels for Table Tennis. To fill these holes, comparative tests were done using the BDHI method of the invention and the repeated median filter.

The median filter is repeatedly applied to the interpolated frames until all the holes are filled. The support of the median filter is a square of 5×5 pixels. For each undetermined pixel, the median filter searches for the median value of the interpolated pixels within the support and assigns it to the undetermined pixel. If all the support falls within a hole, the undetermined pixel will be determined in the next repeated filtering process. For Football, the median filtering was repeated as many as 6 times to fill all the holes for one frame.

Table I below reports the PSNR of the filled pixels. The proposed BDHI results in PSNR values that are higher than those obtained with the median filter, specifically, 1.28 dB higher for Football and 0.41 dB higher for Table Tennis.

TABLE I

| Sequence | BDHI | Median filter |
| --- | --- | --- |
| Football | 24.27 | 22.99 |
| Table tennis | 25.85 | 25.44 |

To evaluate the performance of the new methods in the context of motion-compensated frame up-conversion (MC-FRUC), three existing MC-FRUC methods were used as a benchmark: a typical bi-directional method illustrated in FIG. 3, an object-based algorithm disclosed by Wang et al. in the abovementioned U.S. Pat. No. 6,625,333, and a commercial plug-in product, Twixtor™ 4.5.11, available from "RE: Vision Effects" Inc, California, USA.

The first benchmark algorithm, a typical bi-directional MC-FRUC algorithm, utilizes bi-directional motion estimation and overlapped block motion compensation (OBMC). The bi-directional motion estimation test results were taken from the abovementioned article by Kang et al. entitled "Motion compensated frame rate up-conversion using extended bilateral motion estimation". Kang et al. tested their bi-directional algorithm using four test sequences: Flower garden, Mobile, Foreman, and Football. The test conditions were the same. The test sequences had a spatial resolution of 352×288 pixels, a frame rate of 30 frames per second, and a length of 101 frames. The inventors first removed the 50 odd frames, interpolated 50 new odd frames in their place, and computed the average PSNR of the interpolated frames. As shown in Table II below, the average PSNR of the bi-directional MC-MRUC for the four test sequences are the same as those presented by Kang et al. The unidirectional MC-FRUC using the new methods of the invention provides PSNR gains of 1.44 dB for one test sequence and over 3 dB for the other three.

TABLE II

| Test sequence | Proposed unidirectional MC-FRUC | Bi-directional MC-FRUC | Object-based MC-FRUC | Twixtor 4.5.11 |
| --- | --- | --- | --- | --- |
| Flower garden | 30.76 | 29.32 | 30.32 | 29.23 |
| Mobile | 29.01 | 25.39 | 28.51 | 28.50 |
| Foreman | 35.38 | 31.82 | 34.80 | 34.91 |
| Football | 24.51 | 21.31 | 23.57 | 22.95 |
| Average | 29.91 | 26.96 | 29.30 | 28.90 |

The second benchmark algorithm, the object-based MC-FRUC algorithm disclosed in the abovementioned U.S. Pat. No. 6,625,333, is based on image segmentation, object-based motion field processing, and a method for measuring motion reliability. From Table II, the MC-FRUC method of the invention outperforms this benchmark algorithm for all four test sequences. The average PSNR gain is 0.61 dB.

The last benchmark algorithm, Twixtor™ 4.5.11, is used as a plug-in to Adobe After Affects™ 6.5 available from Adobe Systems Inc., California, USA. Since Twixtor™ 4.5.11 works with video in RGB format, we have to convert the test sequences from YCrCb 4:2:0 format to RGB format and convert back after the frame rate conversion. The interpolated odd frames, therefore, include the distortion of the frame interpolation as well as that of the color format conversion. To exclude the distortion of the color format conversion from the PSNR calculation, the original odd frames also went through the same color format conversion. In addition, Twixtor™ is allowed to either interpolate or repeat frames, depending on a parameter called motion sensitivity. Twixtor was forced to interpolate every odd frame in the experiment. One can conclude from Table II that the MC-FRUC method of the invention performs better than Twixtor™ for all the four test sequences. The average PSNR gain is 1.01 dB.

The methods of the invention have been disclosed in the present application in the application to motion-compensated frame interpolation (MCFI) only by way of an example. The methods of the invention are equally applicable to other image interpolation tasks, such as disparity compensated stereoscopic view interpolation. In particular, the methods of the invention are usable for a view reconstruction and/or depth adjustment for a stereoscopic video.

The methods of the invention can be implemented using any suitable processor, including a field-programmable gate array (FPGA), a microprocessor, a computer, etc. The computer code implementation of the methods of the invention can be stored and/or transmitted using a suitable computer readable medium.

What is claimed is:

1. A method for image interpolation between first and second images, comprising:
   (a) dividing the first image into contiguous blocks of pixels;
   (b) obtaining a forward motion field from the first image to the second image, wherein the forward motion field includes a plurality of motion vectors, wherein each motion vector corresponds to a displacement of a particular one of the blocks of step (a) from the first image to the second image;
   (c) expanding boundaries of the blocks of step (a) for an overlap therebetween, and weighting pixel values of thus expanded blocks using a pre-defined two-dimensional weight matrix;
   (d) applying the forward motion field of step (b) to the pixel value weights of the expanded blocks of step (c), so as to obtain a two-dimensional matrix of cumulative pixel value weights for computing a first interpolated image;
   (e) applying the forward motion field of step (b) to the pixel values of the expanded blocks of step (c), so as to obtain a two-dimensional matrix of cumulative pixel values for computing the first interpolated image; and
   (f) computing the first interpolated image by dividing cumulative pixel values of step (e) by corresponding cumulative pixel value weights of step (d) for each pixel of the first interpolated image,
   wherein the first and the second images are representable by two-dimensional matrices $F_1(i,j)$ and $F_2(i,j)$, respectively, of pixel values;
   wherein in step (d), the two-dimensional matrix of cumulative pixel value weights is obtained using the formula $\omega(i+\tau x_B, j+\tau y_B) += w(i-i_0, j-j_0)$;
   wherein in step (e), the two-dimensional matrix of cumulative pixel values is obtained using the formula $\zeta(i+\tau x_B, j+\tau y_B) += w(i-i_0, j-j_0)[(1-\tau)F_1(i,j)+\tau F_2(i+x_B, j+y_B)]$; and
   wherein in step (f), the first interpolated image is computed as $$F_f(i, j) = \begin{cases} \zeta(i, j)/\omega(i, j), & \text{if } \omega(i, j) > 0 \\ H_f, & \text{otherwise;} \end{cases}$$

wherein i,j are pixel coordinates; $i_0$, $j_0$ are pixel coordinates of a first pixel of an expanded block $B_E$ of the expanded blocks of step (c); += denotes accumulation over the expanded blocks of step (c); $(x_B, y_B)$ is a motion vector of the forward motion field of step (b), the motion vector $(x_B, y_B)$ corresponding to the expanded block $B_E$; $\tau$ is a separation between the first image and the first interpolated image divided by a separation between the first and the second images; $H_f$ is a constant corresponding to an undetermined pixel in the first interpolated image $F_f(i,j)$; and w(x,y) is the pre-defined two-dimensional weight matrix of step (c).

2. The method of claim 1, further including
   (g) dividing the second image into contiguous blocks of pixels;
   (h) computing a second interpolated image by performing steps (b) through (f) using a backward motion field from the second image to the first image, wherein the backward motion field includes a plurality of motion vectors, wherein each motion vector corresponds to a displacement of a particular one of the blocks of step (g) from the second image to the first image; and
   (i) combining the first and the second interpolated images into a combined interpolated image.

3. The method of claim 2, wherein in step (i), the combined interpolated image is a weighted average of the first and the second interpolated images,
   wherein pixel values of the first interpolated image are weighted in dependence upon a difference between corresponding pixel values of the second image and an image obtained by applying the forward motion field to the first image; and
   wherein pixel values of the second interpolated image are weighted in dependence upon a difference between corresponding pixel values of the first image and an image obtained by applying the backward motion field to the second image.

4. The method of claim 2, wherein the first interpolated image includes a first location having the undetermined pixel, wherein in step (i), the combined interpolated image has pixels having values corresponding to pixel values of the second interpolated image at the first location.

5. The method of claim 2, wherein the combined interpolated image includes a first location having the undetermined pixel, the method further including
   (j) determining a value of the undetermined pixel at the first location in dependence on values of pixels disposed outside the first location.

6. The method of claim 5, wherein step (j) includes
   (j1) dividing the combined interpolated image into contiguous hole interpolation blocks, wherein a first hole interpolation block includes the first location;
   (j2) calculating averages of absolute differences between values of adjacent pixels disposed along first and second mutually orthogonal lines within or no more than two pixels away from the first hole interpolation block and outside the first location;
   (j3) filling the first location with pixels having values derived from a value of at least one pixel disposed on each of the first and second mutually orthogonal lines of step (j2), wherein the derived values are weighted by a reciprocal of the averages calculated in step (j2).

7. The method of claim 6, wherein in step (j3), values of pixels disposed along the first and second mutually orthogonal lines within or no more than one pixel away from the first hole interpolation block are taken into account when calculating the averages of absolute differences.

8. A method for image interpolation between first and second images, comprising:
   (a) dividing the first image into contiguous blocks of pixels;
   (b) obtaining a forward motion field from the first image to the second image, wherein the forward motion field includes a plurality of motion vectors, wherein each motion vector corresponds to a displacement of a particular one of the blocks of step (a) from the first image to the second image;
   (c) expanding boundaries of the blocks of step (a) for an overlap therebetween, and weighting pixel values of thus expanded blocks using a pre-defined two-dimensional weight matrix;
   (d) applying the forward motion field of step (b) to the pixel value weights of the expanded blocks of step (c), so as to obtain a two-dimensional matrix of cumulative pixel value weights for computing a first interpolated image;
   (e) applying the forward motion field of step (b) to the pixel values of the expanded blocks of step (c), so as to obtain a two-dimensional matrix of cumulative pixel values for computing the first interpolated image; and
   (f) computing the first interpolated image by dividing cumulative pixel values of step (e) by corresponding cumulative pixel value weights of step (d) for each pixel of the first interpolated image,
   wherein the first and the second images are representable by two-dimensional matrices $F_1(i,j)$ and $F_2(i,j)$, respectively, of pixel values;
   wherein in step (d), the two-dimensional matrix of cumulative pixel value weights is obtained using the formula $\omega(i+\tau x_B, j+\tau y_B) += w(i-i_0, j-j_0)$;
   wherein in step (e), the two-dimensional matrix of cumulative pixel values is obtained using the formula $\zeta(i+\tau x_B, j+\tau y_B) += w(i-i_0, j-j_0)[(1-\tau)F_1(i,j)+\tau F_2(i+x_B, j+y_B)]$ for those blocks of step (b) that are not occluded, and the formula $\zeta(i+\tau x_B, j+\tau y_B) += w(i-i_0, j-j_0)F_1(i,j)$ for occluded blocks of step (b); and
   wherein in step (f), the first interpolated image is computed as $$F_f(i,j) = \begin{cases} \zeta(i,j)/\omega(i,j), & \text{if } \omega(i,j) > 0 \\ H_f, & \text{otherwise;} \end{cases}$$

wherein i,j are pixel coordinates; $i_0, j_0$ are pixel coordinates of a first pixel of an expanded block $B_E$ of the expanded blocks of step (c); += denotes accumulation over the expanded blocks of step (c); $(x_B, y_B)$ is a motion vector of the forward motion field of step (b), the motion vector $(x_B, y_B)$ corresponding to the expanded block $B_E$; τ is a separation between the first image and the first interpolated image divided by a separation between the first and the second images; $H_f$ is a constant corresponding to an undetermined pixel in the first interpolated image $F_f(i,j)$; and w(x,y) is the pre-defined two-dimensional weight matrix of step (c).

9. The method of claim 8, further including
   (g) dividing the second image $F_2(i,j)$ into contiguous blocks of pixels;
   (h) computing a second interpolated image $F_b(i,j)$ by performing steps (b) through (f) using a backward motion field from the second image $F_2(i,j)$ to the first image $F_1(i,j)$, wherein the backward motion field includes a plurality of motion vectors, wherein each motion vector corresponds to a displacement of a particular one of the blocks of step (g) from the second image to the first image;
   (i) combining the first and the second interpolated images into a combined interpolated image $F_c(i,j)$ using the formula $$F_c(i,j) = \begin{cases} \frac{E_b(i,j)+\alpha}{E_f(i,j)+E_b(i,j)+2\alpha}F_f(i,j) + \frac{E_f(i,j)+\alpha}{E_f(i,j)+E_b(i,j)+2\alpha}F_b(i,j), & \text{if } F_f(i,j) \neq H_f \text{ and } F_b(i,j) \neq H_b \\ F_f(i,j), & \text{if } F_f(i,j) \neq H_f \text{ and } F_b(i,j) = H_b \\ F_b(i,j), & \text{if } F_f(i,j) = H_f \text{ and } F_b(i,j) \neq H_b \\ H_c & \text{otherwise} \end{cases}$$

wherein $H_b$ is a constant corresponding to an undetermined pixel in the second interpolated image $F_b(i,j)$; $H_c$ is a constant corresponding to an undetermined pixel $P_H$ in the combined interpolated image $F_c(i,j)$, wherein $E_f(i,j)=\epsilon(i,j)/\omega(i,j)$, if $\omega(i,j)>0$, wherein $\epsilon(i+\tau x_B, j+\tau y_B) += w(i-i_0, j-j_0)|F_1(i,j)-F_2(i+x_B, j+y_B)|$, and wherein a is a pre-defined parameter.

10. The method of claim 9, further including
    (j) replacing the value $H_c$ of the undetermined pixel $P_H$ with a value $p_H$ calculated using values of pixels different from the undetermined pixel $P_H$.

11. The method of claim 10, wherein step (j) includes
    (j1) dividing the combined interpolated image into contiguous hole interpolation blocks of pixels, wherein a first hole interpolation block includes the undetermined pixel $P_H$;
    (j2) calculating averages $a_h$ and $a_v$ of absolute differences between values of adjacent pixels $P_1, P_2$ and $P_3, P_4$, disposed on first and second mutually orthogonal lines $L_h$ and $L_v$, respectfully, using the formula $p2\ a_h=|p_1-p_2|$, $a_v=|p_3-p_4|$, wherein $p_1$ and $p_2$ are values of the pixels $P_1, P_2 \in L_h$, and $p_3$ and $p_4$ are values of the pixels $P_3, P_4 \in L_v$,
    wherein the pixels $P_1, P_2$ and $P_3, P_4$ are disposed within or no more than 2 pixels away from the first hole interpolation block, wherein each of the lines $L_h$ and $L_v$ includes the undetermined pixel $P_H$;
    (j3) calculating the value $p_H$ of the undetermined pixel $P_H$ according to the formula:

$$p_H = \frac{1}{A}\left(\frac{1}{a_h}p_h + \frac{1}{a_v}p_v\right), \text{ wherein:}$$

$$p_h = \begin{cases} \frac{d_r}{d_l+d_r}p_l + \frac{d_l}{d_l+d_r}p_r, & \text{if both } P_l \text{ and } P_r \text{ exist} \\ p_l, & \text{if only } P_l \text{ exists} \\ p_r, & \text{if only } P_r \text{ exists,} \end{cases}$$

wherein $p_l$ and $p_r$ are values of pixels $P_l, P_r \in L_h$ disposed on both sides of the undetermined pixel $P_H$;

$$p_v = \begin{cases} \frac{d_d}{d_u+d_d}p_u + \frac{d_u}{d_u+d_d}p_d, & \text{if both } P_u \text{ and } P_d \text{ exist} \\ p_u, & \text{if only } P_u \text{ exists} \\ p_d, & \text{if only } P_d \text{ exists,} \end{cases}$$

wherein $p_u$ and $p_d$ are values of pixels $P_u, P_d \in L_v$ disposed on both sides of the undetermined pixel $P_H$; and $$A = \frac{1}{a_h} + \frac{1}{a_v}.$$

12. The method of claim 11, wherein the lines $L_h$ and $L_v$ are horizontal and vertical lines, respectively.

13. The method of claim 10, wherein step (j) includes
   (j1) dividing the combined interpolated image into contiguous hole interpolation blocks of pixels, wherein a first hole interpolation block includes the undetermined pixel $P_H$;
   (j2) calculating averages $a_h$, $a_v$, $a_{d1}$, $a_{d2}$ of absolute differences between values of adjacent pixels $P_1$, $P_2$; $P_3$, $P_4$; $P_5$, $P_6$, $P_7$, $P_8$, disposed on first, second, third, and fourth lines $L_h$; $L_v$; $L_{d1}$; $L_{d2}$, respectfully, using the formula
   $a_h=|p_1-p_2|, a_v=|p_3-p_4|, a_{d1}=|p_5-p_6|, a_{d2}=|p_7-p_8|,$
   wherein:
   $p_1$ to $p_8$ are values of the pixels $P_1$ to $P_8$, wherein $P_1$, $P_2 \in L_h$; $P_3$, $P_4 \in L_v$; $P_5$, $P_6 \in L_{d1}$; and $P_7$, $P_8 \in L_{d2}$;

wherein the pixels $P_1$ to $P_8$ are disposed within or no more than 2 pixels away from the first hole interpolation block, wherein each of the lines $L_h$; $L_v$; $L_{d1}$; $L_{d2}$ includes the undetermined pixel $P_H$;

(j3) calculating the value $p_H$ of the undetermined pixel $P_H$ according to the formula:

$$p_H = \frac{1}{A}\left(\frac{1}{a_h}p_h + \frac{1}{a_v}p_v + \frac{1}{a_{d1}}p_{d1} + \frac{1}{a_{d2}}p_{d2}\right), \text{ wherein:}$$

$$p_h = \begin{cases} \frac{d_r}{d_l+d_r}p_l + \frac{d_l}{d_l+d_r}p_r, & \text{if both } P_l \text{ and } P_r \text{ exist} \\ p_l, & \text{if only } P_l \text{ exists} \\ p_r, & \text{if only } P_r \text{ exists,} \end{cases}$$

wherein $p_l$ and $p_r$ are values of pixels $P_l, P_r \in L_h$ disposed on both sides of the undetermined pixel $P_H$;
   $p_v, p_{d1}$, and $p_{d2}$ are determined in accordance with to the above value $p_h$; and $$A = \frac{1}{a_h} + \frac{1}{a_v} + \frac{1}{a_{d1}} + \frac{1}{a_{d2}}.$$

14. The method of claim 13, wherein the lines $L_{d1}$ and $L_{d2}$ are diagonal lines.

* * * * *